United States Patent [19]

Ryu et al.

[11] Patent Number: 4,568,105

[45] Date of Patent: Feb. 4, 1986

[54] AUTOMATIC SAFETY SEATBELT

[75] Inventors: Nobuyuki Ryu, Toyota; Noritada Yoshitsugu, Aichi, both of Japan

[73] Assignee: Toyota Jidosha Kabushiki Kaisha, Japan

[21] Appl. No.: 604,142

[22] Filed: Apr. 26, 1984

[30] Foreign Application Priority Data

May 12, 1983 [JP] Japan .................................. 58-71070[U]

[51] Int. Cl.⁴ .................................................. B60R 21/10
[52] U.S. Cl. ................................... 280/802; 280/807; 280/808; 297/475; 297/483
[58] Field of Search ............... 280/801, 802, 804, 807, 280/808; 297/468, 474, 475, 483; 296/155

[56] References Cited

U.S. PATENT DOCUMENTS

| | | | |
|---|---|---|---|
| 1,928,523 | 9/1933 | Bally | 296/155 |
| 2,955,872 | 10/1960 | Barenyi | 296/155 |
| 3,915,495 | 10/1975 | Oehm | 297/475 |
| 4,061,365 | 12/1977 | Nagano et al. | 280/804 |
| 4,223,915 | 9/1980 | Tanaka et al. | 280/804 |
| 4,291,897 | 9/1981 | Minami | 280/807 |
| 4,372,580 | 2/1983 | Motonami et al. | 280/806 |
| 4,394,050 | 7/1983 | Spooner | 280/801 |

*Primary Examiner*—Joseph F. Peters, Jr.
*Assistant Examiner*—Kenneth R. Rice
*Attorney, Agent, or Firm*—Parkhurst & Oliff

[57] ABSTRACT

An automatic safety seatbelt apparatus for extending a seatbelt from a seatbelt retractor apparatus, through a guide ring fixed on a lower side face of a longitudinal floor tunnel, to a shoulder anchor mounted on an upper portion of the vehicle body. The guide ring ensures a proper diagonal extension of the seatbelt across an upper half of the body of a seated passenger.

16 Claims, 5 Drawing Figures

AUTOMATIC SAFETY SEATBELT

BACKGROUND OF THE INVENTION

The present invention relates to an automatic safety seatbelt installed in a vehicle, and more particularly to an automatic safety seatbelt which properly extends diagonally across a passenger in the vehicle such that it combines comfort and safety for the user.

Many current vehicle designs utilize some type of longitudinal floor tunnel for such items as a fuel tank installed thereunder. Hence, the height of the longitudinal tunnel must permit a fuel tank to be installed underneath the tunnel, requiring in many instances a significant vertical height. This creates a limited amount of space for mounting a seatbelt retractor within the passenger compartment. Therefore, it has been proposed that a seatbelt retractor should be mounted on a top surface of the longitudinally extending floor tunnel. When the seatbelt retractor is mounted on the top surface of the longitudinally extending floor tunnel, the seatbelt retractor typically is positioned such that it is higher than a passenger's hip. Hence, as shown in FIG. 3, if a shoulder webbing 10 is pulled through a webbing guide 18 from a seatbelt retractor cover 24, the shoulder webbing 10 extends diagonally across a passenger's chest to a shoulder anchor, which is fixed at an upper point of the vehicle body at a position which is vertically higher than a desirable position. This result occurs because the shoulder webbing 10 exits the seatbelt retaining cover 24 through the webbing guide 18 at an undesirably high vertical position. This causes a passenger to experience discomfort.

SUMMARY OF THE INVENTION

The present invention was made in view of the foregoing background and to overcome the foregoing drawbacks. It is accordingly an object of this invention to provide an automatic safety seatbelt which permits a proper extension of the seatbelt webbing diagonally across a chest of a seated passenger even when a webbing retractor is mounted vertically above the hip of a seated passenger, such as when the webbing retractor is mounted on top of a longitudinally extending floor tunnel.

To attain the above objects, an automatic safety seatbelt according to the present invention has a seatbelt webbing for restraining a seated passenger. The webbing extends from a webbing retractor, mounted on a top surface of a longitudinally extending floor tunnel, through a guide ring and to a shoulder anchor mounted on an upper portion of the vehicle body. The guide ring is mounted on a lower portion of a side surface of the longitudinally extending floor tunnel such that the webbing from the webbing retractor downwardly extends to the guide ring, and then diagonally across the chest of the seated passenger.

BRIEF DESCRIPTION OF THE DRAWINGS

The above objects, features and advantages of the present invention will become more apparent from the following description of the preferred embodiment taken in conjunction with the accompanying drawings, wherein.

DETAILED DESCRIPTION OF THE PREFERRED EMBODIMENT

The present invention is described in detail with reference to the accompanying drawings which illustrate an embodiment of the present invention.

Figure 1:
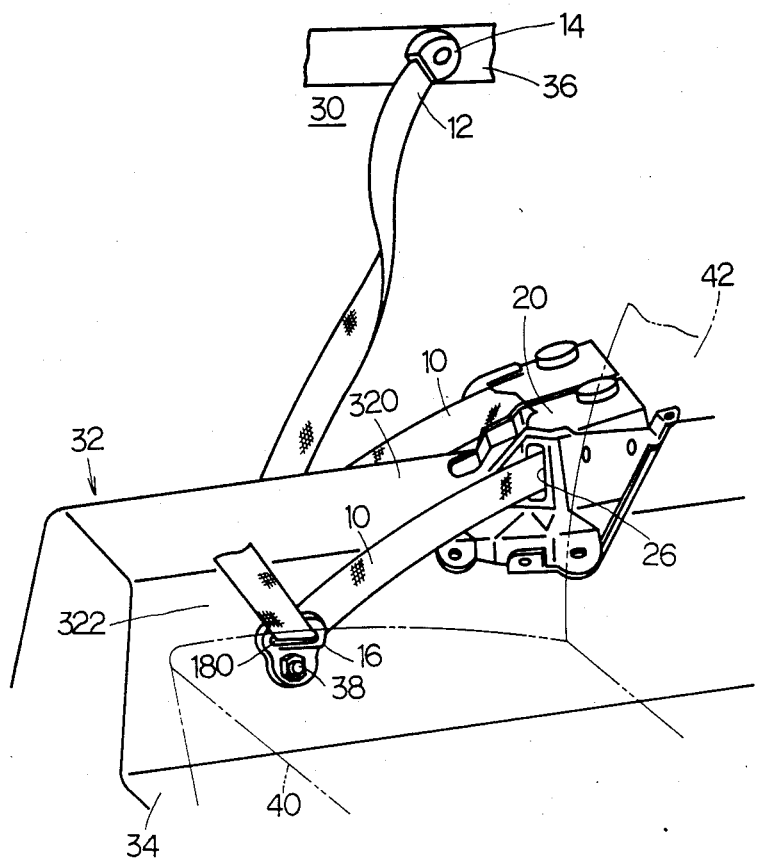
FIG. 1 is a perspective view of an automatic safety seatbelt apparatus according to the present invention.

FIG. 1 shows a perspective view of an automatic safety seatbelt apparatus according to the present invention. The numeral 40 designates a seat which a passenger sits upon. A floor tunnel 32 is provided between the seat cushions 40 and a second seat cushion (not shown in drawings) and extends longitudinally in the vehicle. The floor tunnel 32 has a flat top surface 320 and side faces 322, which extend downwardly from the top surface 320 to a floor 34 of the vehicle body. A shoulder webbing retractor apparatus 20 is fixed on the top surface 320 of the floor tunnel 32 by an appropriate means (not shown in drawings). The shoulder webbing retractor apparatus 20 has a spring therein (not shown in drawings) for exerting a biasing force on a shoulder webbing 10 causing the shoulder webbing 10 to be constantly pulled into the shoulder webbing retractor apparatus 20.

According to the shoulder webbing retractor apparatus 20, shown in FIG. 1, a pair of shoulder webbing retractors are provided in a single housing. The dual retractors are used to pull two separate shoulder webbings for two passengers seated side-by-side in the vehicle. Each shoulder webbing retractor apparatus 20 has an opening 26 through which the shoulder webbing 10 may be pulled outwardly. A guide ring 16 is rotatably secured by a bolt 38 onto each side face 322 of the floor tunnel 32, permitting the guide ring 16 to be rotated around the bolt 38. Each guide ring 16 is fastened to the side face 322 of the floor tunnel 32 at a position which is vertically below the position of the shoulder webbing retractor apparatus 20 and adjacent to a forward portion of each seat cushion 40. Each guide ring 16 has a slit 180 which extends longitudinally therein. The shoulder webbing 10 is pulled through the opening 26, downwardly toward each guide ring 16. The shoulder webbing 10 then extends through the slit 180 of each guide ring 16 to respective shoulder anchors 14 (for simplicity, only one shoulder anchor 14 is shown in FIG. 1). The slit 180 of each guide ring 16 positioned at a point which is just slightly below the upper surface of each seat cushion 40. This design permits the shoulder webbing 10 to properly extend from the hip of a seated passenger to the shoulder anchor 14, such that it does not result in the passenger experiencing any discomfort.

An upper end 12 of the shoulder webbing 10 is connected to the shoulder anchor 14 and the shoulder anchor 14 is mounted on a guide rail 36. The guide rail 36 is provided inside the vehicle body 30 at an upper portion thereof. The shoulder anchor 14 is mounted on the guide rail 36 permitting the shoulder anchor 14 to be slidable on the guide rail 36. The shoulder anchor 14 is displaced toward the front of the vehicle along the guide rail 36 when a vehicle door is opened, and is displaced toward the rear of the vehicle along the guide rail 36, when the vehicle door is closed. The detailed disclosure of this portion of the automatic safety seatbelt occurs in U.S. Pat. No. 4,223,915, whose disclosure is hereby incorporated by reference herein.

Figure 2:
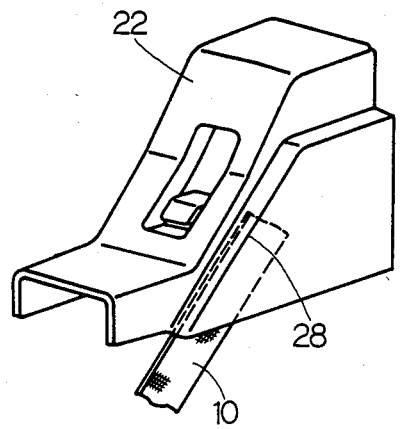
FIG. 2 is a perspective view of a retractor cover which covers a portion of the automatic safety seatbelt, according to the present invention.
Figure 3:
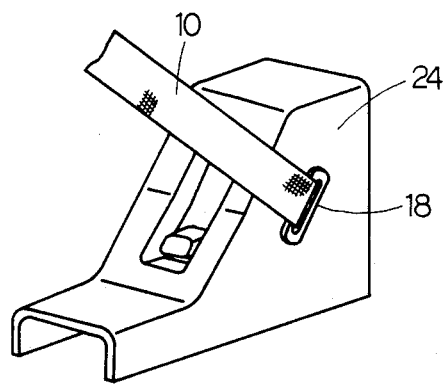
FIG. 3 is a perspective view of a known retractor cover employed in another automatic safety seatbelt apparatus.

FIG. 2 shows a retractor cover 22 for covering the shoulder webbing retractor apparatus 20, shown in FIG. 1. The retractor cover 22 is mounted over the shoulder webbing retractor apparatus 20. The cover 22 has downwardly inclined front side portions 28. Therefore, each shoulder webbing 10 can be guided along an inner surface of the inclined front side portions 28, when pulled from the shoulder webbing retractor apparatus 20. The inclined front side portions 28 assist in the guiding of the shoulder webbing 10 toward the guide ring 16. The shoulder webbing 10 has an edge which is in contacting engagement with a forwardly located inner surface of the inclined front side portions 28 and a flat portion which is in contacting engagement with an outwardly located inner surface of the inclined front side portions 28.

Figure 4:
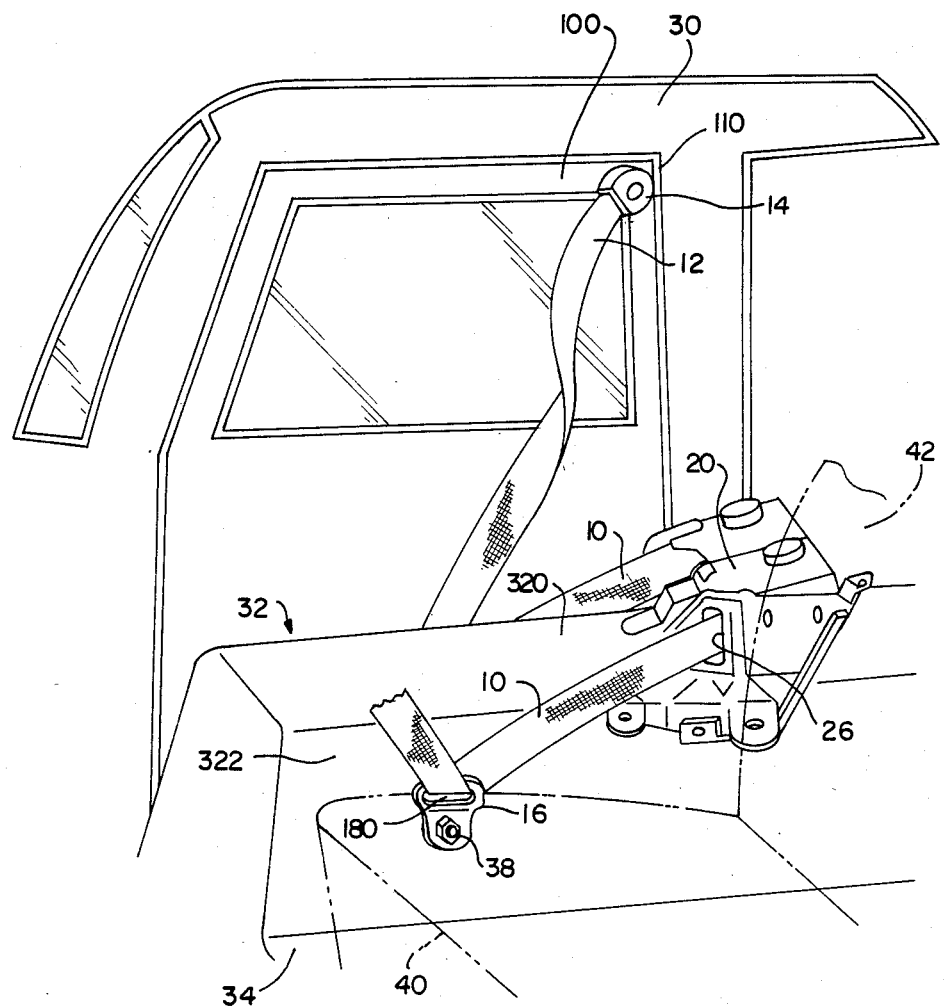
FIG. 4 is a perspective view of an automatic safety seatbelt and guide rail apparatus according to the present invention.

FIG. 4 shows the retractor apparatus 20, vehicle body 30, shoulder anchor and sliding member 14, door 100 and the upper, rearwardly portion of the door 110.

Figure 5:
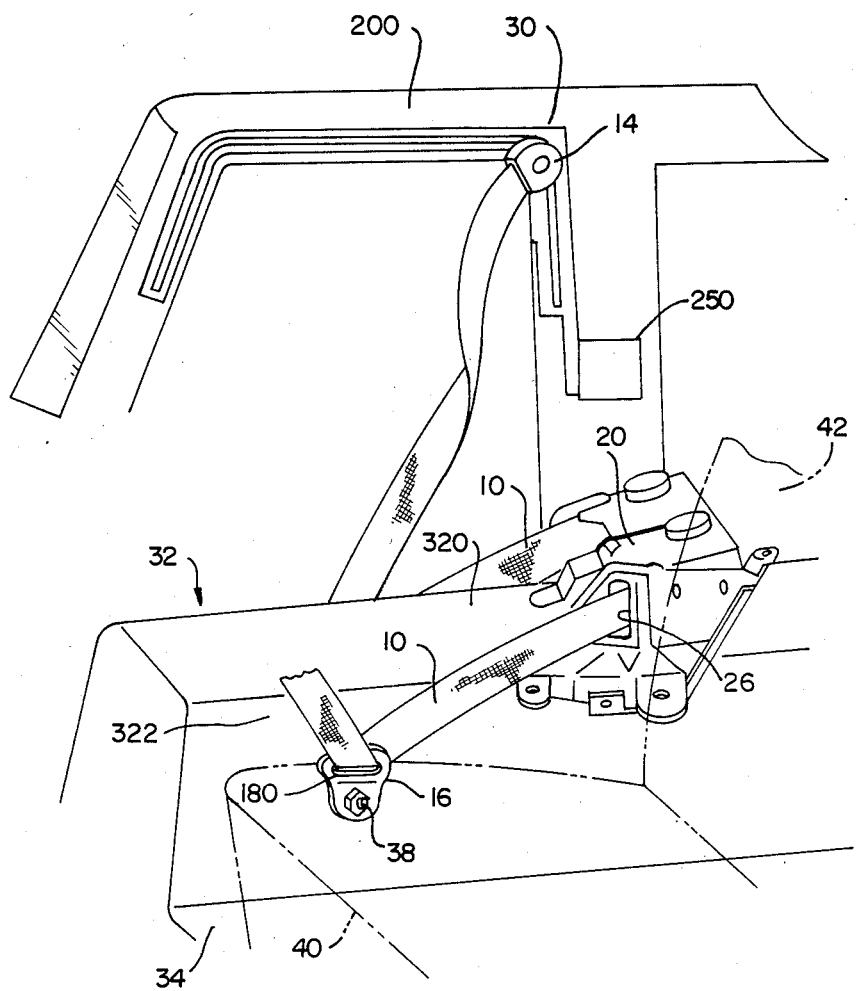
FIG. 5 is a perspective view of an automatic safety seatbelt apparatus and a cross sectional view of a guide rail and driving means according to the present invention.

FIG. 5 shows retractor apparatus 20, vehicle body 30, shoulder anchor and sliding member 14, roof side rail and guide rail 200, and driving means 250.

In operation, when a passenger opens a vehicle door, the shoulder anchor 14 is displaced toward the front of the vehicle. The forward displacement provides an ample space between the shoulder webbing 10 and a seat back 42 to permit a passenger to easily enter the vehicle and be located upon the seat cushion 40. When the passenger closes the vehicle door, the shoulder anchor 14 is displaced toward the rear of the vehicle, resulting in the seatbelt extending diagonally across the chest of the seated passenger. The shoulder webbing 10 extends from the shoulder webbing retractor apparatus 20, mounted on the top surface 320 of the floor tunnel 32, to the guide ring 16. Because the guide ring 16 is provided at a lower vertical position than the upper surface of the seat cushion 40, the shoulder webbing 10 properly extends from a point adjacent the hip of the seated passenger, diagonally across the chest of the seated passenger, and to the shoulder anchor 14. Hence, the passenger does not experience any discomfort from an improperly located shoulder webbing 10. When the passenger opens the vehicle door, the shoulder anchor 14 is forwardly displaced, permitting the passenger to freely exit the vehicle. Additionally, when the shoulder anchor 14 is forwardly and rearwardly displaced, the guide ring 16 rotates in a clockwise or counterclockwise direction to facilitate the displacement of the shoulder anchor 14. Hence, the shoulder webbing is moved smoothly along the guide rail 36.

The shoulder anchor 14 may be fixed on an upper portion of a vehicle door, as disclosed in the U.S. Pat. No. 4,372,580, whose disclosure is hereby incorporated by reference herein. In this case, when the vehicle door is opened, the shoulder webbing is pulled from the webbing retractor 20 and this assures that an ample space between the shoulder webbing 10 and the seat 40 is created for a passenger to enter the vehicle.

While the present invention has been described in its preferred embodiments, it is to be understood that the invention is not limited thereto, and may be otherwise embodied within the scope of the following claims.

What is claimed is:

1. An automatic safety seatbelt apparatus for restraining a seated passenger, a portion of said apparatus being installed on a longitudinally extending floor tunnel in a vehicle comprising:

webbing for restraining the seated passenger, the webbing having a first end and a second end;

a webbing retractor apparatus attached to said first end of the webbing, for maintaining a biasing force upon said webbing, the retractor being mounted on a top surface of the longitudinally extending floor tunnel;

a guiding means rotatably mounted on a side surface of the longitudinally extending floor tunnel, the guiding means having a slit therethrough, through which the webbing from the webbing retractor apparatus extends;

a shoulder anchor provided inside the vehicle and mounted on an upper portion of the vehicle, the shoulder anchor being fixed to said second end of the webbing and being longitudinally displaceable in the vehicle; and a retractor cover for covering the webbing retractor apparatus, the retractor cover comprising
   a top portion;
   a first side portion fixed to said top portion;
   a second side portion fixed to said top portion;
   a first inclined front side portion fixed to said first side portion, said first inclined front side portion having a downwardly inclined inner surface for covering said webbing located between a first webbing retractor and a first guiding means; and
   a second inclined front side portion fixed to said second side portion, having a downwardly inclined inner surface for covering said webbing located between a second webbing retractor and a second guiding means.

2. The apparatus of claim 1, wherein a pair of webbing retractors are mounted on the top surface of the longitudinally extending floor tunnel.

3. The apparatus of claim 1, wherein said guiding means comprises a rotatably mounted guide ring.

4. The apparatus of claim 3, wherein the guide ring is mounted on the side surface of the longitudinally extending floor tunnel at a position adjacent to a forward position of a passenger seat mounted on a floor of the vehicle.

5. The apparatus of claim 4, wherein the guide ring is mounted on the side surface of the longitudinally extending floor tunnel at a position wherein the slit through the guide ring is located vertically below an upper surface of the passenger seat.

6. The apparatus of claim 5, wherein a second guide ring is mounted on a second side surface of the longitudinally extending floor tunnel.

7. The apparatus of claim 1, wherein the retractor cover further comprises an inclined front portion fixed to said top portion, said first side portion and said second side portion.

8. An automatic safety seatbelt apparatus, a portion of which apparatus is installed on a longitudinally extending floor tunnel in a vehicle, comprising:

a belt member having a first end, an intermediate portion and a second end;

a retractor apparatus fixed to an upper face of the longitudinally extending floor tunnel and the retractor apparatus contacts said first end of the belt member;

a guide ring rotatably mounted to the vehicle and located at a position longitudinally in front of and vertically below the retractor apparatus, the guide ring having an opening therethrough, through which said intermediate portion of the belt member extends;

a retractor cover having a top portion which covers the retractor apparatus, a first side portion fixed to said top portion, said first side portion covering a portion of the belt member which extends from the retractor apparatus to the guide ring; and a first inclined front side portion fixed to said first side portion, said first inclined front side portion having a downwardly inclined inner surface for covering said belt member located between said retractor apparatus and said guide ring.

9. The apparatus of claim 8, wherein said second end of said belt member is fixed to an upper, rearwardly located portion of a door of the vehicle.

10. The apparatus of claim 8, wherein said second end of said member is fixed to a sliding member which is slidable along a roof side rail in a guide rail which longitudinally extends along the vehicle.

11. The apparatus of claim 10, further comprising a driving means for driving the sliding member in the guide rail in a forward longitudinal direction when the door is opened and in a rearward longitudinal direction when the door is closed.

12. The apparatus of claim 11, wherein the belt member has 2 flat faces and 2 edge faces and one of said edge faces is in contacting engagement with a forwardly located inner surface of said first inclined front side portion and one of said flat faces is in contacting engagement with an outwardly located inner surface of said first inclined front side portion.

13. The apparatus of claim 8, wherein a pair of retractor apparatuses are mounted on the upper face of the longitudinally extending floor tunnel and a second of said pair of apparatuses contacts a first end of a second belt member.

14. The apparatus of claim 13, wherein the retractor cover further comprises:

a second side portion fixed to said top portion;

a second inclined front side portion fixed to said second side portion, said second inclined front side portion having a downwardly inclined inner surface for covering said second belt member located between said second retractor apparatus and a second guide ring, said second guide ring being located at a position longitudinally in front of and vertically below said second retractor apparatus.

15. The apparatus of claim 8, wherein the guide ring is rotatably mounted on a first side wall of the longitudinally extending floor tunnel and located adjacent to a front seat cushion.

16. The apparatus of claim 8, wherein the retractor cover also covers a portion of a side wall of the longitudinally extending floor tunnel.

* * * * *